US006122654A

United States Patent [19]

Zhou et al.

[11] Patent Number: 6,122,654

[45] Date of Patent: Sep. 19, 2000

[54] COMPLEX MULTIPLICATION CIRCUIT

[75] Inventors: Changming Zhou; Xuping Zhou; Guoliang Shou, all of Tokyo, Japan

[73] Assignee: Yozan Inc., Tokyo, Japan

[21] Appl. No.: 09/066,540

[22] Filed: Apr. 27, 1998

[30] Foreign Application Priority Data

Apr. 28, 1997 [JP] Japan .................................... 9-122803

[51] Int. Cl.[7] ........................................................ G06F 7/52

[52] U.S. Cl. ............................................ 708/622; 708/319

[58] Field of Search ..................................... 708/622, 319, 708/301, 819, 823

[56] References Cited

U.S. PATENT DOCUMENTS

| | | | |
|---|---|---|---|
| 3,926,367 | 12/1975 | Bond et al. | 708/622 |
| 4,344,151 | 8/1982 | White | 708/622 |
| 5,694,349 | 12/1997 | Pal | 708/622 |
| 5,936,872 | 8/1999 | Fischer et al. | 708/622 |
| 5,983,253 | 11/1999 | Fischer et al. | 708/622 |

*Primary Examiner*—David H. Malzahn
*Attorney, Agent, or Firm*—Pillsbury Madison & Sutro LLP

[57] ABSTRACT

A complex multiplication circuit of a calculation formula equivalent but different from the usual formula.

The calculation formula is as follows:

Pr={x(a+b)−b(x+y)} equivalent to (ax−by)

Pi={y(a−b)+b(x+y)} equivalent to (ay+bx)

Here,

Input signal: x+jy

Multiplier:a+jb

Multiplication result:Pr+jPi.

9 Claims, 7 Drawing Sheets

COMPLEX MULTIPLICATION CIRCUIT

BACKGROUND OF THE INVENTION

1. Field of the Invention

The present invention relates to a complex multiplication circuit for multiplying a complex input signal by a complex multiplier and a filter circuit using the multiplication circuit.

2. Description of the Related Art

A complex filter is used for an orthogonal transformation such as quadrature detection and for filtering an orthogonal signal in an orthogonal space. A channel filter is proposed in the Technical Report of the Institute of Electronics, Information and Communication Engineers MW96-219 (February 1997), which delays an orthogonal signal, multiplies the delayed signal by a complex multiplier and adds the multiplication result to the original orthogonal signal.

A complex multiplication circuit is the main device for the filter of complex multiplier. There are some digital signal processors (DSP) for complex-multiplier filter on the market, for example, part number PDSP16112 by Plessy Semiconductors Inc., HSP43168 by Harris Semiconductor Ion and so forth.

FIG. 7 is a block diagram of the conventional complex multiplication circuit consisting of multipliers 101 to 104 and adders 105 and 106. A complex input signal (x+jy) is multiplied by a complex multiplier (a+jb) so as to output an multiplication result $P=P_R+jP_I$ as follows.

$$\begin{aligned} P &= P_R + jP_1 \\ &= (a+jb)(x+jy) \\ &= (ax\ by) + j(ay+bx) \end{aligned} \tag{1}$$

The multiplication circuit performs multiplications ax, ay, bx and by by the multipliers 101, 102, 103 and 104. The outputs of multiplier 104 are subtracted from the output of the multiplier 101 by an adder 105, the output of multiplier 102 is added to the output of the multiplier 103 by an adder 106.

FIG. 8 is a circuit diagram of complex-multiplier ester. The input x in held by a series of sampling and holding circuits 61 to 63. The input y is held by a series of sampling and holding circuits 68 to 70. The held input x is multiplied by multipliers a0, to aN−1 in the multipliers 111 to 113 and multiplied by multipliers b0 to bN−1 in the multipliers 115 to 117. The held input y is multiplied by multipliers a0 to aN−1 in the multipliers 119 to 121 and multiplied by multipliers b0 to bN−1 in the multipliers 123 to 125.

Outputs from the multipliers 111 to 113 are summed by an adder 114, and outputs from the multipliers 115, to 117 are summed by an adder 118. Outputs from the multipliers 119 to 121 are summed by an adder 122, and outputs from the multipliers 123 to 125 are summed by an adder 126. The sum outputted from the adder 126 is subtracted from the sum outputted from the adder 114 to generate the real output $P_R(n)$. The sum outputted from the adder 118 is added to the sum outputted from the adder 122 to generate the imaginary output $P_I(n)$.

$P_R(n)$ and $P_I(n)$ are calculated as in the equations (2) and (3).

$$P_R(n) = \sum_{i=0}^{N-1} \{a(i)\cdot x(i) - b(i)\cdot y(i)\} \tag{2}$$

$$P_1(n) = \sum_{i=0}^{N-1} \{b(i)\cdot x(i) + a(i)\cdot y(i)\} \tag{3}$$

Here, x(i) and y(i) (i=0, 1, 2, . . . , N−1) are with signals held at the ith timing dock.

The multiplication circuit above is large in size because it consist of two very large multipliers. This causes a serious problem in applications which require small size, light weight and low power consumption.

The DSP by Harris processes the multiplication using a time-sharing sequence which decreasing the size of the circuit. However, the process also decreases the speed.

SUMMARY OF THE INVENTION

The present invention solves the above conventional problems and provides a complex multiplication circuit having a small size and a high process speed.

According to the present invention the calculation of complex multiplication is more easy processed than in the conventional circuit.

DETAILED DESCRIPTION

An embodiment of the complex multiplication circuit of the present invention is described with reference to the attached drawings.

Figure 1:
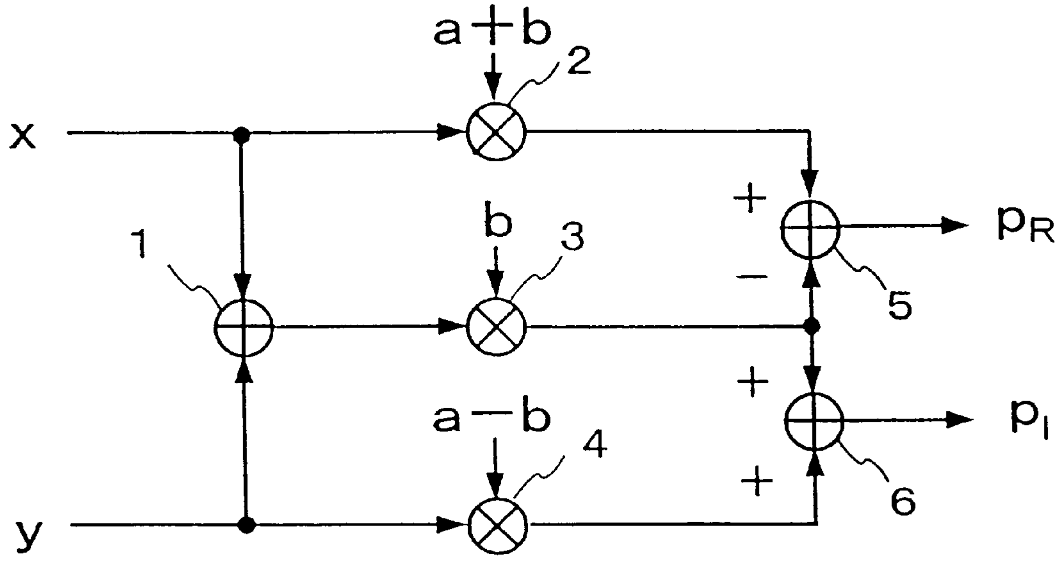
FIG. 1 is a circuit diagram of a complex multiplication circuit according to the present invention.

In FIG. 1, a complex multiplication circuit includes an adder 1 for adding input signals x and y, which are the zeal portion and the imaginary portion of the complex input signal. There are three multipliers 2, 3 and 4. The multiplier 2 multiplies x by a multiplier (a+b). The multiplier 3 multiplies an output from the adder 1 by a multiplier b. The multiplier 4 multiplies y by a multiplier (a−b). The multipliers a and b are the real portion and imaginary portion of the multiplier (a+jb). The output of the multiplier 2 is x(a+b) and is input to an adder 5. The output of the multiplier 3 is b(x+y) and is input to an adders 5 and 6. The output of multiplier 4 is y(a−b) and is input to an adder 6. The adder 5 subtracts the output of the multiplier 3 from the output of the multiplier 2. The adder 6 adds the output of the multiplier 3 with the output of the multiplier 4. Then the adder 5 generates the real portion $P_R$ of the complex multiplication result and the adder 6 generates the imaginary portion $P_I$.

Equations (4) and (5) represents the results yielded by the multiplication circuit.

$$P_R=x(a+b)-b(x+y)=ax-by \quad (4)$$

$$P_I=y(a-b)+b(x+y)=bx+ay \quad (5)$$

Therefore, a result equivalent to the result yielded in the equation (1) is realized by the multiplication circuit of this invention which has less components than the conventional circuit.

The multipliers a and b are constants in the channel filter. Therefore additional circuit components are unnecessary in the multiplication circuit, because (a+b) and (a−b) can be generated by a CPU or other circuits outside of the multiplication circuit.

The polarity of the adder 1 and multipliers 2 to 4 may be changed to invert the outputs shown in FIG. 1. However, the polarity of the adders 5 and 6 would change to conform with the polarity change of the adder 1 and multipliers 2 to 4.

Figure 2:
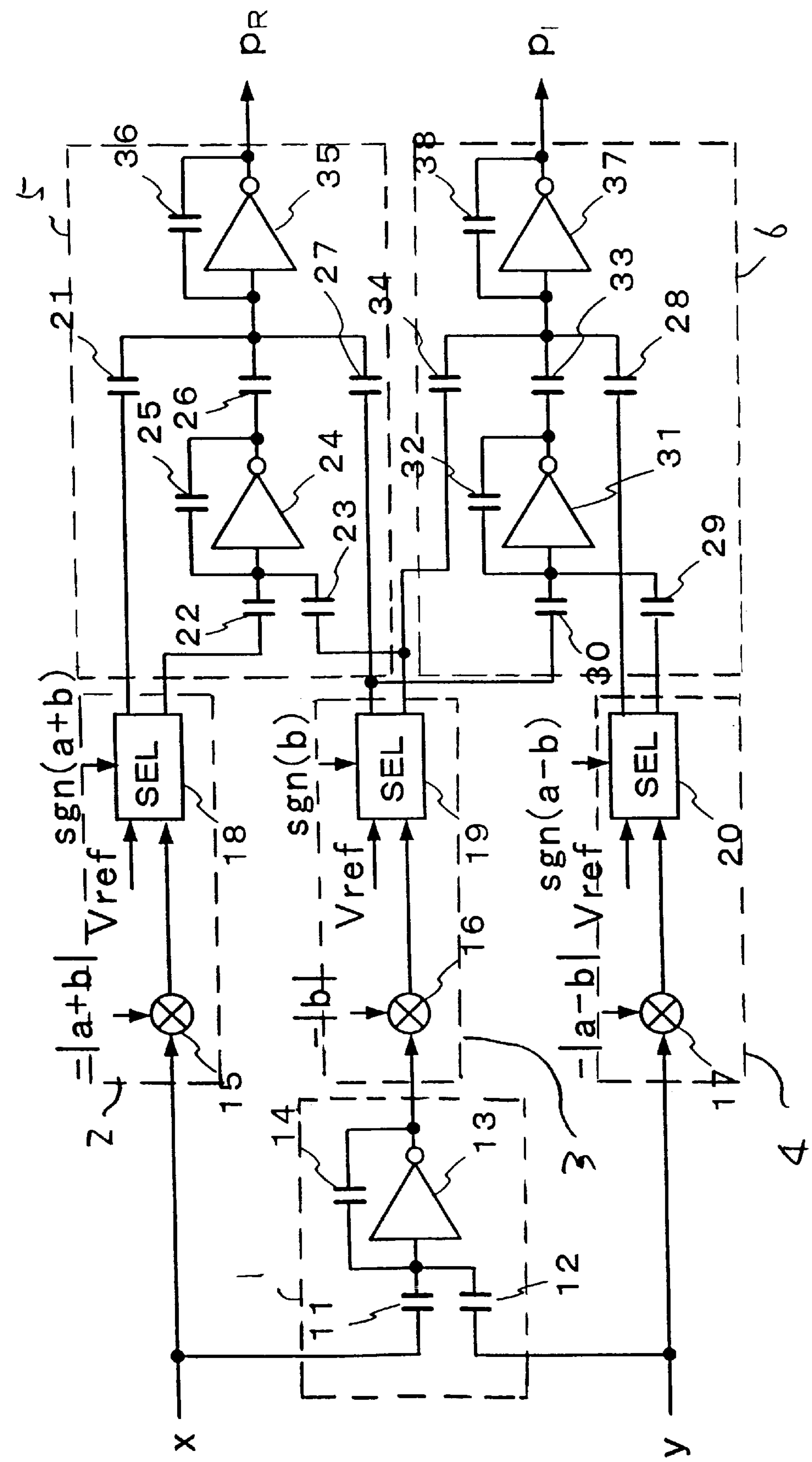
FIG. 2 is a detailed circuit diagram of the circuit in FIG. 1.

FIG. 2 shows the multiplication circuit in greater detail. The adder 1 has capacitances 11 and 12. The outputs of capacitances 11 and 12 are connected to a common output terminal. The output terminal is connected to an inverter 13. A feedback capacitance 14 is connected to the inverter 13 at its input and output terminals.

The multiplier 2 has a multiplier 15 and a selector 18 serially connected. The multiplier 15 multiplies x by a negative absolute value |a+b|. The selector 18 has two inputs and two outputs. An output of the multiplier 15 is connected to one input of the selector 18, and a reference voltage Vref is connected to the other input. One of the inputs is selectively connected to one of the outputs, and the other input is connected to the other output.

The multiplier 3 has a multiplier 16 and a selector 19 serially connected. The multiplier 16 multiplies(x+y) by a negative absolute value |b|. The selector 19 has two inputs and two outputs. An output of the multiplier 16 is connected to one input of the selector and the reference voltage ref is connected to the other input. One of the inputs i$ selectively connected to one of the outputs, and the other input is connected to the other output.

The multiplier 4 has a multiplier 17 and a selector 20 serially connected. The multiplier 17 multiplies y by a negative absolute value −|a−b|. The selector 20 has two inputs and two outputs. An output of the multiplier 17 is connected to one input of the selector 20 and the reference voltage Vref is connected to the other input. One of the inputs is selectively connected to one of the outputs, and the other input is connected to the other output.

The adder 5 has capacitances 22 and 23. The outputs of capacitances 22 and 23 are connected to a common output terminal. The output terminal is connected to an inverter 24. A feedback capacitance 25 is connected to the inverter 24 at its input and output terminals. Capacitances 21, 26 and 27 are connected to a common output terminal. The capacitance 22 is connected to one output of the selector 18 and the capacitance 21 is connected to the other output. The capacitance 23 is connected to one output of the selector 19 and the capacitance 27 is connected to the other output. The capacitance 26 is connected to the output of the inverter 24.

The output of the capacitances 21, 26 and 27 is connected to an inverter 35. A feedback capacitance 36 is connected at the input and output terminals of the inverter 35.

The adder 6 has capacitances 29 and 30. The outputs of capacitances 29 and 30 are connected to a common output terminal. The output terminal is connected to an inverter 31. A feedback capacitance 32 is connected to the inverter 31 at its input and output terminals. Capacitances 28, 33 and 34 are connected to a common output terminal. The capacitance 29 is connected to one output of the selector 20 and the capacitance 28 is connected to the other output. The capacitance 30 is connected to one output of the selector 19 and the capacitance 34 is connected to the other output. The capacitance 33 is connected to the output of the inverter 31.

The output of the capacitances 28, 33 and 34 is connected to an inverter 37. A feedback capacitance 38 is connected at the input and output terminals of the inverter 37.

Figure 3:
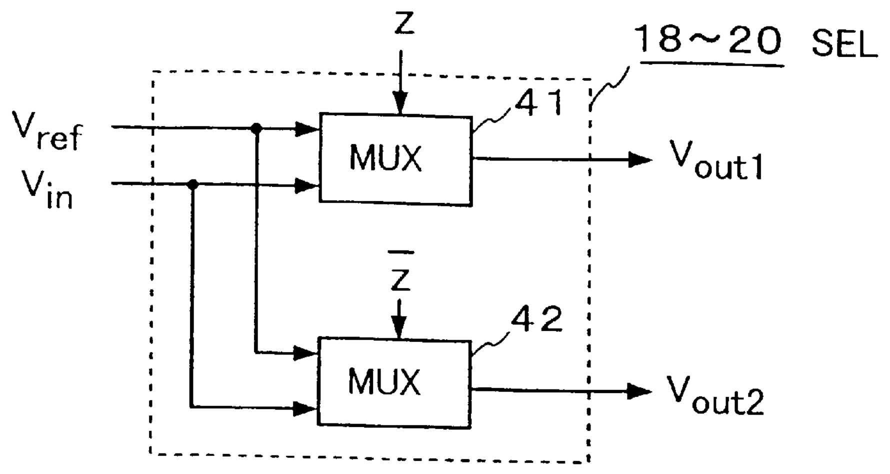
FIG. 3 is a circuit diagram of a selecter in FIG. 2.

FIG. 3 shows the selectors 18 to 20 in grater detail. The selectors 18 to 20 have two multiplexers 41 and 42 each receiving the voltage Vin from the multipliers 15 to 17 and the reference voltage Vref. A control, signal z and its invert z are input to the multiplexers 41 and 42, respectively causing one of Vin and Vref to be alternatively output as Vout from the multiplexer 41 and the other to be output as Vout2 from the multiplexer 42.

Figure 4:
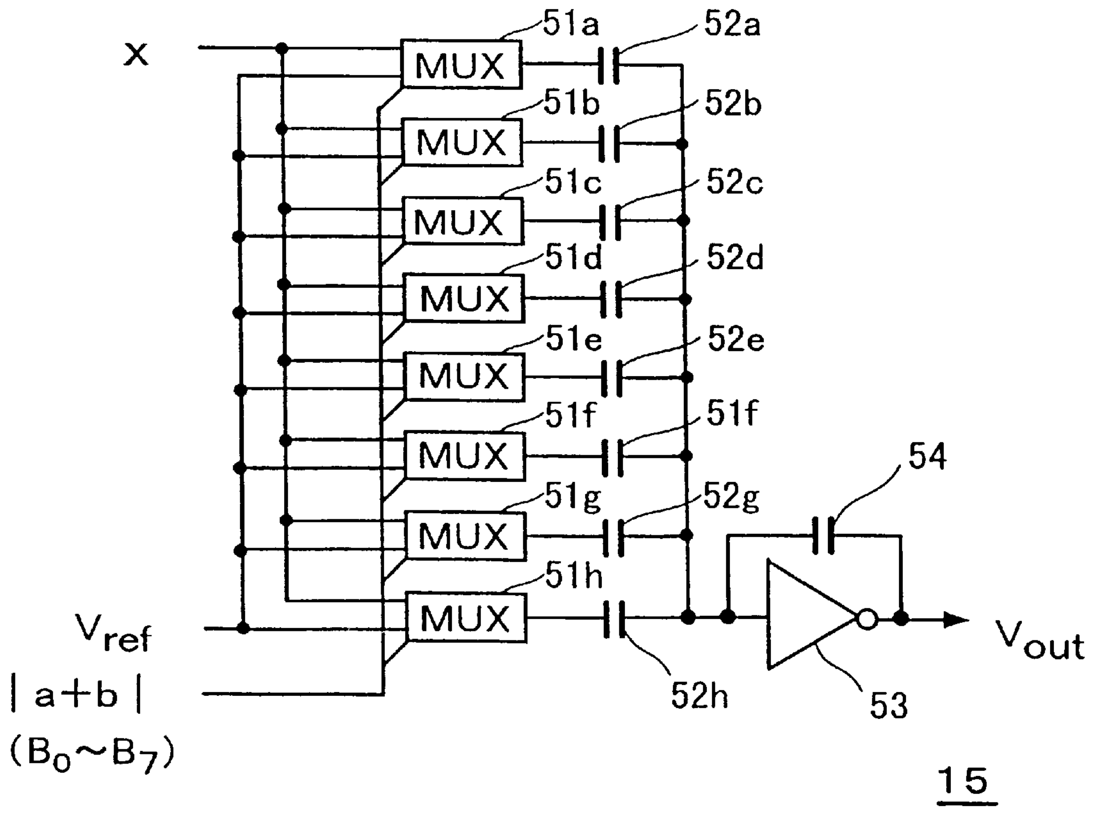
FIG. 4 is a multiplier shown in FIG. 2.

FIG. 4 is a circuit diagram of the multiplier 15. The multiplier 15 multiplies the input x by a binary multiplier defined by a capacitive coupling. The capacitive coupling consists of capacitances 52*a*, 52*b*, 52*c*, 52*d*, 52*e*, 52*f*, 52*g* and 52*h* output which are connected to a common output terminal. The output of the capacitive coupling is connected an inverter 53. A feedback capacitance 54 is connected to the inverter 53 at its input and output. A plurality of multiplexers 51*a* to 51*h* corresponding to capacitances 52*a* to 52*h* are connected to input side of the corresponding capacitances. The multiplexers 51*a* to 51*h* are controlled by a control signal corresponding to the absolute value |a+b| to alternatively output the input x or the reference voltage Vref. The capacitances 52*a* to 52*h* have capacity proportional to weights of binary digits B0 to B7. The output Vout is shown in the equation (6). Here, the offset voltage of inverter 53 is Vb, the capacity of the capacitance 54 is C54 and the capacities of the capacitances 52*a* to 52*h* are C520 to C527.

$$Vout-Vb=-\frac{\sum_{i=0}^{7}Bi\cdot(x-Vb)\cdot C52i}{C54} \quad (6)$$

The capacitance ratio of the capacitance C54 and C52*i* is as in the equation (7) the equation (6) is transformed as in the equation (8).

$$C52i=2^i\cdot C0 \quad (7)$$

$$Vout-Vb=-\frac{\sum_{i=0}^{7}2^iBi\cdot(x-Vb)\cdot C0}{C54} \quad (8)$$

When C54 is defined as in the equation (9), the equation (8) is further simplified to be the equation (10).

$$C54=\sum_{i=0}^{7}Ci \quad (9)$$

$$Vout=-\sum_{i=0}^{7}\frac{2^i}{255}\cdot x+2\cdot Vb \quad (10)$$

Since the output Vout from the inverter 53 is an inverted weighted addition of x weighted by binary digits, the negative absolute value −|a+b| is the multiplier of the multiplier 15. When (a+b) is positive, the selector 18 introduces the output of the multiplier 15 to the capacitance 21 causing the output to be inverted. When (a+b) is negative, the selector 18 output to the capacitance 22 causing the output to be twice inverted.

The multipliers 16 and 17 are similar to the multiplier 15, thus the description is omitted.

The selector 19 is controlled so that when "b" is positive, the output from the multiplier 16 is introduced to the capacitance 34 and when "b" is negative, the output is introduced to the capacitance 27.

The selector 20 is controlled so that when (a−b) is positive, the output from the multiplier 17 is introduced to the capacitance 28 and when (a−b) is negative, the output is introduced to the capacitance 29.

A capacity ratio of capacitances 11, 12 and 14 is 1:1:2. A capacity ratio of capacitances 22, 23 and 25 is 1:2:3, and a capacity ratio of capacitances 21, 26, 27 and 36 is 1:3:1:5. A capacity ratio of capacitances 29, 30 and 32 is 1:2:3, and a capacity ratio of capacitances 28, 33, 34 and 38 is 1:3:1:5. The capacitance ratio is determined for adjusting weights for intermediate outputs in the circuit of FIG. 2.

The adders 5 and 6 performs addition similarly to the weighted addition of the multipliers 2 to 4.

The weighted addition circuits used in the multipliers 2 to 4 and adders 5 and 6 are of low electric power consumption and small in size. The inverter is a circuit published in the Japanese patent publication before examination Hei07-94957, consisting of three stages CMOS inverters serially connected. A pair of balancing resistances and a grounded capacitance are provided for preventing unexpected oscillation due to the feedback line through the feedback capacitance. One half of the supply voltage is utilized as a reference voltage of the CMOS inverters, a voltage higher than the reference voltage is defined as positive and a voltage lower than the reference voltage is defined as negative. When a pair of symmetric positive and negative voltages are impressed to the opposite terminal of the CMOS inverters, the earth becomes the reference voltage.

Figure 5:
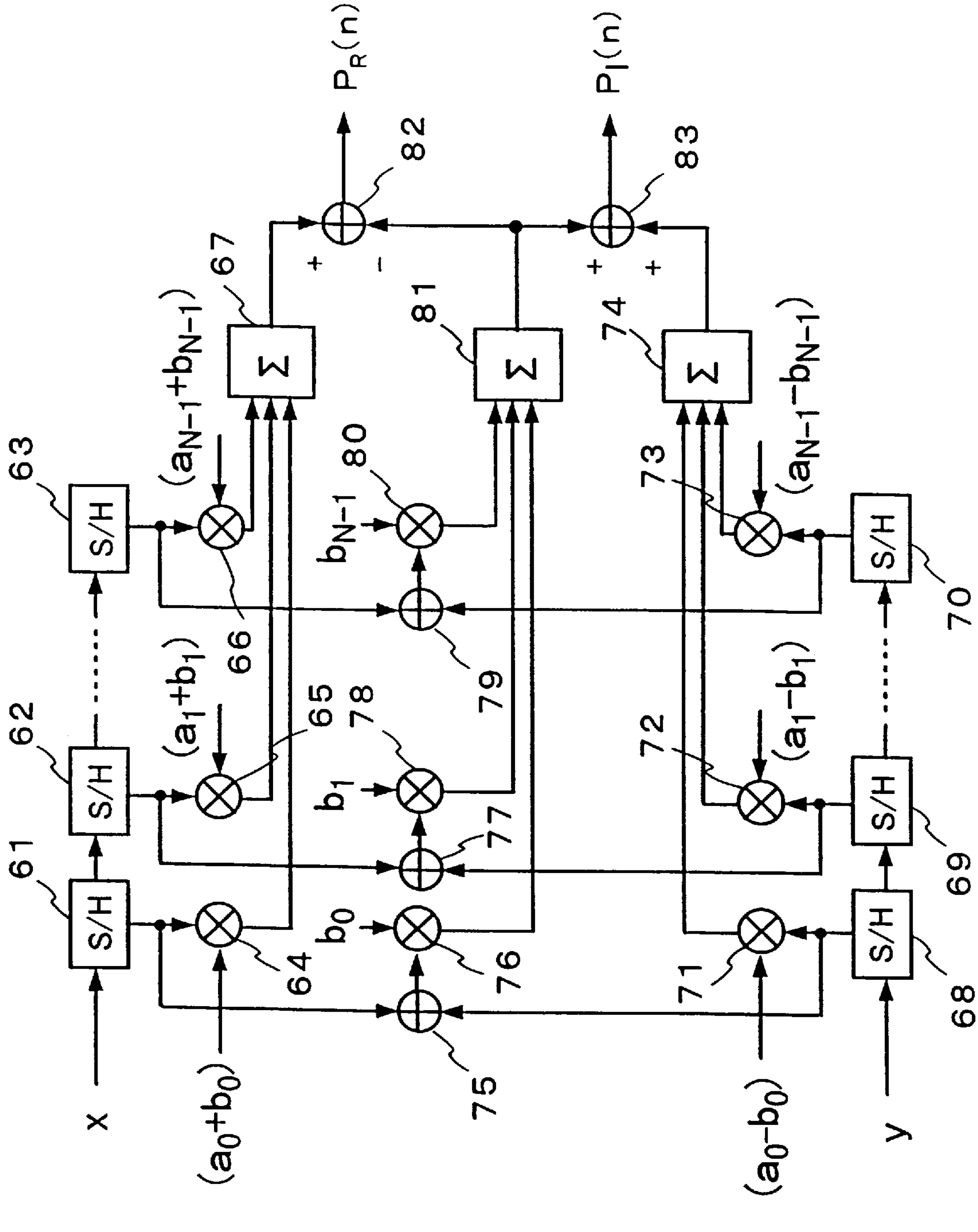
FIG. 5 is a circuit diagram of the first embodiment of a filter circuit.
Figure 8:
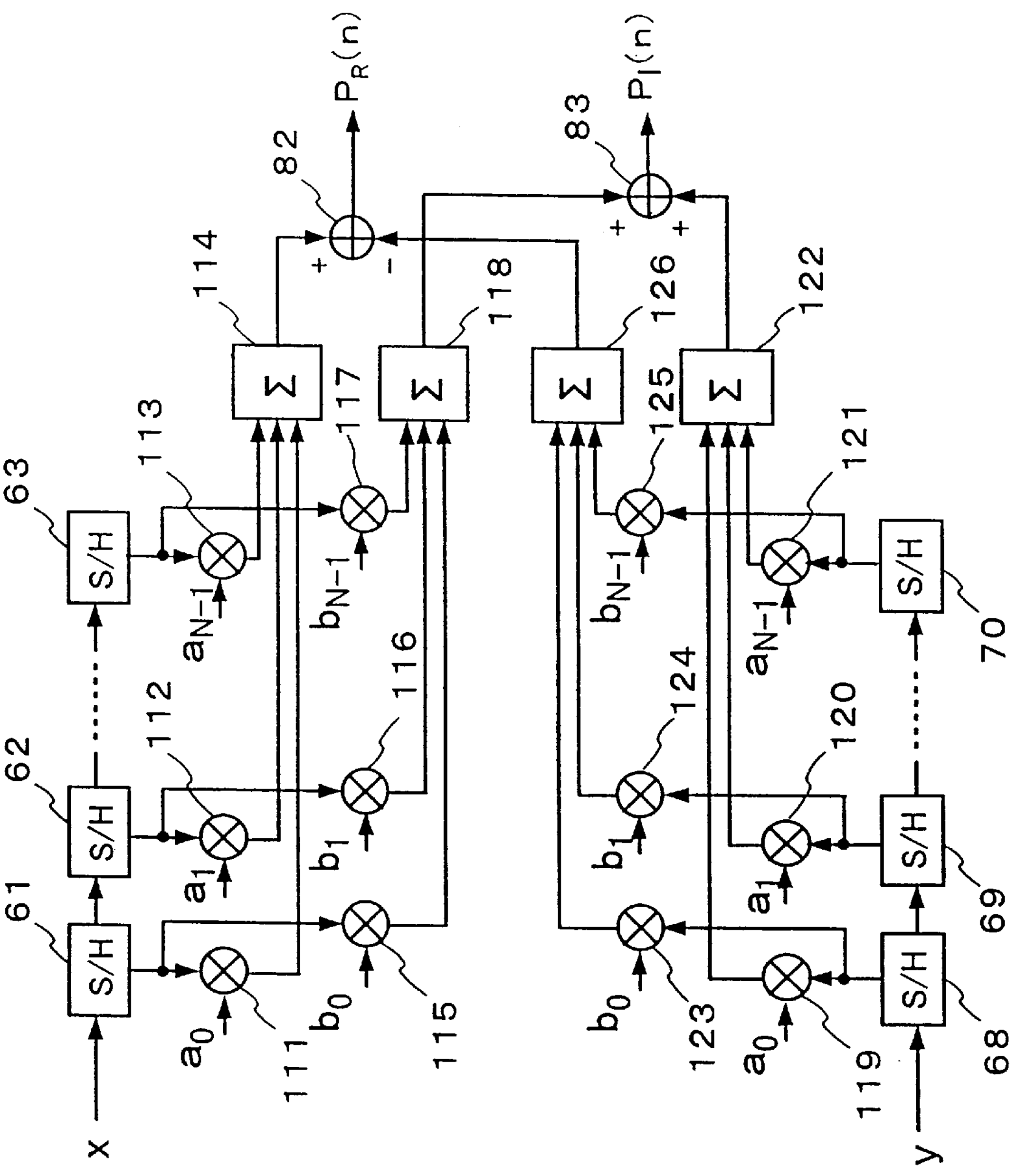
Fig.8 (PRIOR ART)
FIG. 8 is a circuit diagram of a conventional filter circuit.

FIG. 5 is a filter circuit using the multiplication circuit above. The input signals x and y are held in time sequence by series of sampling and holding circuits 61 to 63 and 68 to 70, respectively, similar to the sampling and holding circuits in FIG. 8. A plurality of multipliers 64 to 66 corresponding to the sampling and holding circuits 61 to 63 are connected to corresponding sampling and holding circuits for multiplying the held input signal x by multipliers (a0+b0), (a1+b1), . . . , (aN−1+bN−1), respectively. A plurality of multipliers 71 to 73 corresponding to the sampling and holding circuits 68 to 70 are connected to corresponding sampling and holding circuits for multiplying the held input signal y by multipliers (a0−b0), (a1−b1), . . . , (aN−1+bN−1), respectively. A plurality of adders 75, 77 and 79 corresponding to the sampling and holding circuits 64 to 66 and 68 to 70 are connected to both of corresponding sampling and holding circuits for adding the held input signals x and y. The multipliers 64 to 66 are connected to an adder 67 for calculating the total summation of outputs from the sampling and holding circuits 61 to 63. The multipliers 71 to 73 are connected to an adder 74 for calculating the total summation of outputs from the sampling and holding circuits 68 to 70. The multipliers 76, 78 and 80 are connected to an adder 81 for calculating the total summation of outputs from the adders 75, 77 and 79. Outputs from the adders 67 and 81 are input to an adder 82 for subtracting the output of the adder 81 from the output of the adder 67. Outputs from the adders 74 and 81 are input to an adder 83 for adding these outputs.

Figure 6:
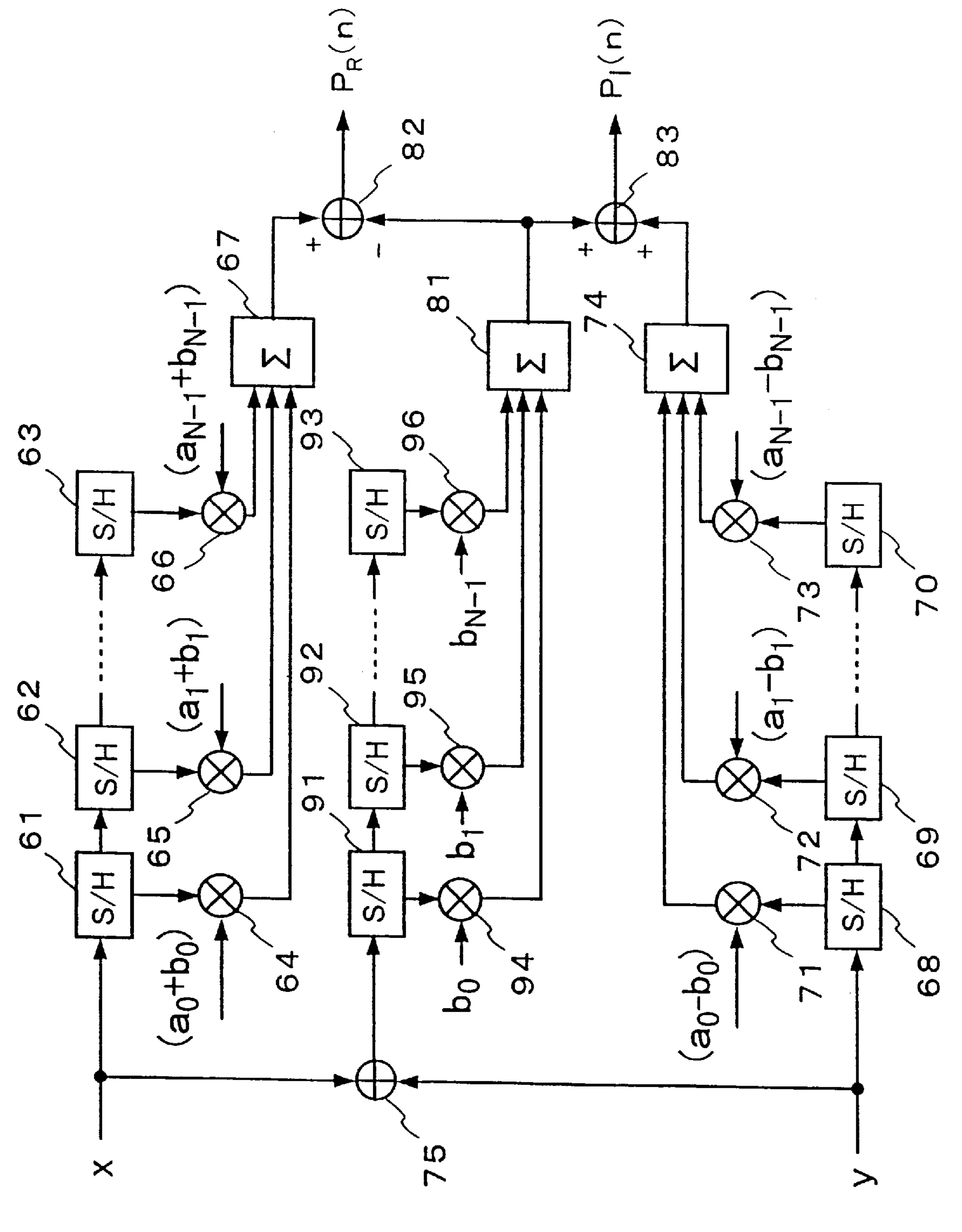
FIG. 6 shows the second embodiment of a filter circuit.
Figure 7:
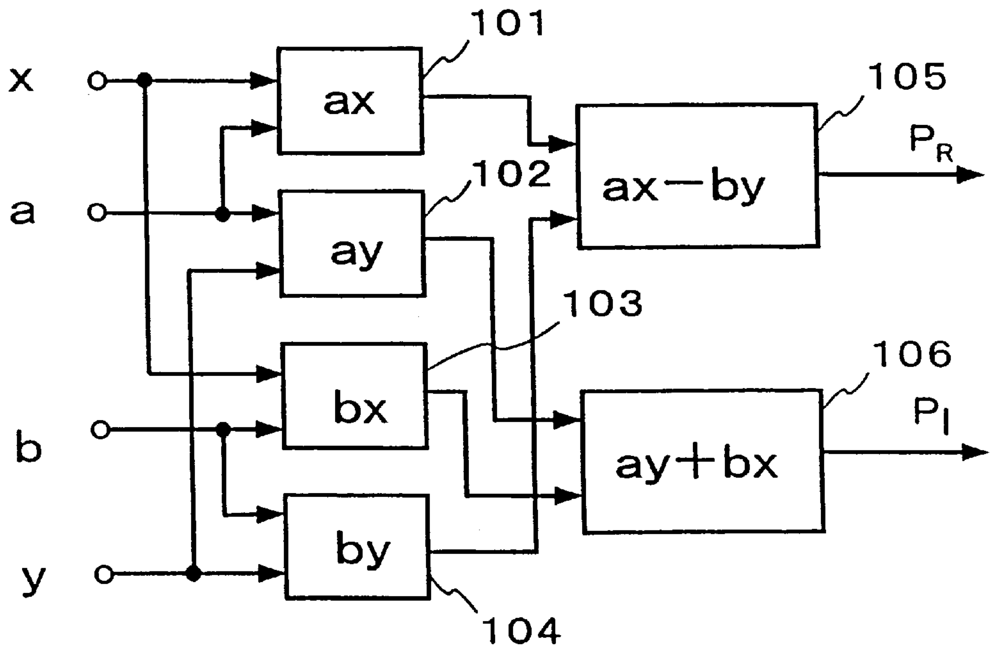
Fig. 7 (PRIOR ART)
FIG. 7 is a circuit diagram of a conventional complex multiplication circuit.

FIG. 6 shows a variation of the filter circuit. An additional series of sampling and holding circuits 91 to 93 are provided for sampling and holding an output of an adder 75. The adder 75 adds the input signals x and y before input to the series of sampling and holding circuits 61 to 63, 71 to 73 and 91 to 93. The sampling and holding circuits are connected to multipliers 94 to 96 outputs of which are integrated by an adder 81 similar to the adder 81 in FIG. 5. The adders 82 and 83 are similar to the adders 82 and 83 in FIG. 5. The total circuit size of the sampling and holding circuits 91 to 93 is smaller than the adders 75, 77 and 79 in FIG. 5. The connections of this circuit is more simple than in FIG. 5, because connections from sampling and holding circuits to the adders 75, 77 and 79 are neglected. This makes the total circuit smaller. The multiplication circuit 2 can similarly be applied to the filter circuits.

What is claimed is:

1. A complex multiplication circuit for multiplying an input signal having a real portion x and an imaginary portion by a multiplier having a real portion a and an imaginary portion b comprising:

(i) a first multiplier for multiplying said read portion of said input signal by an addition of said real and imaginary portions of said multiplier;

(ii) a second multiplier by multiplying said imaginary portion of said input signal by a difference between said real and imaginary portions of said multiplier;

(iii) a first adder for adding said real and imaginary portions of said input signal, said first adder comprising a capacitive coupling having two capacitances outputs of which are connected to a common output terminal for receiving said real and imaginary portions of said input signal;

(iv) a third multiplier for multiplying an output of said first adder by said imaginary portion b of said multiplier;

(v) a second adder for calculating a difference between an output of said first multiplier and said an output of said third multiplier; and (vi) a third adder for adding an output of said second multiplier and said output of said third multiplier.

2. A complex multiplication circuit as claimed in claim 1, wherein said first adder further comprises:

(i) an inverter connected to said output of said capacitive coupling; and (ii) a feedback capacitance connected to said inverter at its input and output terminals.

3. A complex multiplication circuit as claimed in claim 1, wherein each of said first to third multipliers comprises:

(i) a multiplier for multiplying an input by an absolute value of a multiplier; and (ii) a selector for outputting a multiplication result of said multiplier alternatively one of two outputs in response to a sign of said multiplier.

4. A complex multiplication circuit as claimed in claim 3, wherein said third adder comprises:

(i) a first capacitive coupling having first and second capacitances wherein its outputs are connected to a common output terminal;

(ii) an inverter connected to said output of said first capacitive coupling;

(iii) a feedback capacitance connected to said inverter at its input and output terminals; and (iv) a second capacitive coupling having third, fourth and fifth capacitances wherein its outputs are connected to a common output terminal, said third capacitance corresponds to said first capacitance alternatively connected to outputs of said second multiplier in response to said sign of said multiplier of said second multiplier, said fourth capacitance corresponds to said second capacitance alternatively connected to outputs of said third multiplier in response to said sign of said multiplier of said third multiplier, said fifth capacitance being connected to an output of said inverter.

5. A complex multiplication circuit as claimed in claim 4, wherein said third adder further comprises:

(i) an inverter connected to an output of said second capacitive coupling; and (ii) a feedback capacitance connected to said inverter at its input and output terminals, and said multipliers in said first to third multipliers are negative absolute values.

6. A complex multiplication circuit as claimed in claim 1, wherein said second adder comprises:

(i) a first capacitive coupling having first and second capacitances wherein its outputs are connected to a common output terminal;

(ii) an inverter connected to said output of said first capacitve coupling;

(iii) a feedback capacitance connected to said inverter at its input and output terminals; and (iv) a second capacitive coupling having third, fourth and fifth capacitances wherein its outputs are connected to a common output terminal, said third capacitance corresponds to said first capacitance alternatively connected to outputs of said first multiplier in response to said sign of said multiplier of said first multiplier, said fourth capacitance corresponds to said second capacitance alternatively connected to outputs of said third multiplier in response to said sign of said multiplier of said third multiplier, said fifth capacitance being connected to an output of said inverter.

7. A complex multiplication circuit as claimed in claim 6, wherein said second added further comprises:

(i) an inverter connected to an output of said second capacitive coupling; and (ii) a feedback capacitance connected to said inverter at its input and output terminals, and said multipliers in said first to third multipliers are negative absolute values.

8. A filter circuit for multiplying an input signal being successively inputed, said input signal having a real portion x and an imaginary portion y by a multiplier having a real portion a and an imaginary portion b and for adding said multiplication result for a predetermined time distance comprising:

(i) a first series of sampling and holding circuits for holding said real portion of said input signal;

(ii) a plurality of first multipliers corresponding to said sampling and holding circuits of said first series for multiplying said real portion held in said corresponding sampling and holding circuits by an addition of said real and imaginary portions of said multiplier;

(iii) a second series of sampling and holding circuits for holding said imaginary portion of said input signal;

(vii) a plurality of second multipliers corresponding to said sampling and holding circuits of said first series for multiplying said imaginary portion held in said corresponding sampling and holding circuits by a difference of said real and imaginary portions of said multiplier;

(iv) a plurality of first adders for adding real and imaginary portions held in the corresponding sampling and holding circuits;

(v) a plurality of third multipliers corresponding to said first adders for multiplying said addition of real and imaginary portion held in said corresponding sampling and holding circuits by said imaginary portion of said multiplier;

(vi) a second adder for calculating a total sum of outputs of said first multipliers;

(vii) a third adder for calculating a total sum of outputs of said second multipliers;

(viii) a fourth adder for calculating a total sum of outputs of said third multipliers;

(ix) a fifth adder for subtracting an output from said fourth adder from an output of said second adder; and (x) a sixth adder for adding outputs from said third and fourth adders.

9. A filter circuit for multiplying an input signal being successively inputted, said input signal having a real portion x and an imaginary portion y by a multiplier having a real portion a and an imaginary portion b and for adding said multiplication result for a predetermined time distance comprising:

(i) a first series of sampling and holding circuits for holding said real portion of said input signal;

(ii) a plurality of first multipliers corresponding to said sampling and holding circuits of said first series for multiplying said real portion held in said corresponding sampling and holding circuits by an addition of said real and imaginary portions of said multiplier;

(iii) a second series of sampling and holding circuits for holding said imaginary portion of said input signal;

(iv) a plurality of second multipliers corresponding to said sampling and holding circuits of said second series for multiplying said imaginary portion held in said corresponding sampling and holding circuits by a difference of said real and imaginary portions of said multiplier;

(v) a first adder for adding said real and imaginary portions of said input signal before said first and second series of sampling and holding circuits;

(vi) a third series of sampling and holding circuits for holding an output of said first adder;

(vii) a plurality of third multipliers corresponding to said sampling and holding circuits of said third series for multiplying said addition result held in said corresponding sampling and holding circuits by said imaginary portions of said multiplier;

(viii) a second adder for calculating a total sum of outputs of said first multipliers;

(ix) a third adder for calculating a total sum of outputs of said second multipliers;

(x) a fourth adder for calculating a total sum of outputs of said third multipliers;

(xi) a fifth adder for subtracting an output from said fourth adder from an output of said second adder; and (xii) a sixth adder for adding outputs from said third and fourth adders.

* * * * *